Sept. 3, 1929.  E. CRAIG  1,726,528
MACHINE FOR MAKING AND INSERTING WIRE DEVICES
Filed Jan. 14, 1924  4 Sheets-Sheet 3
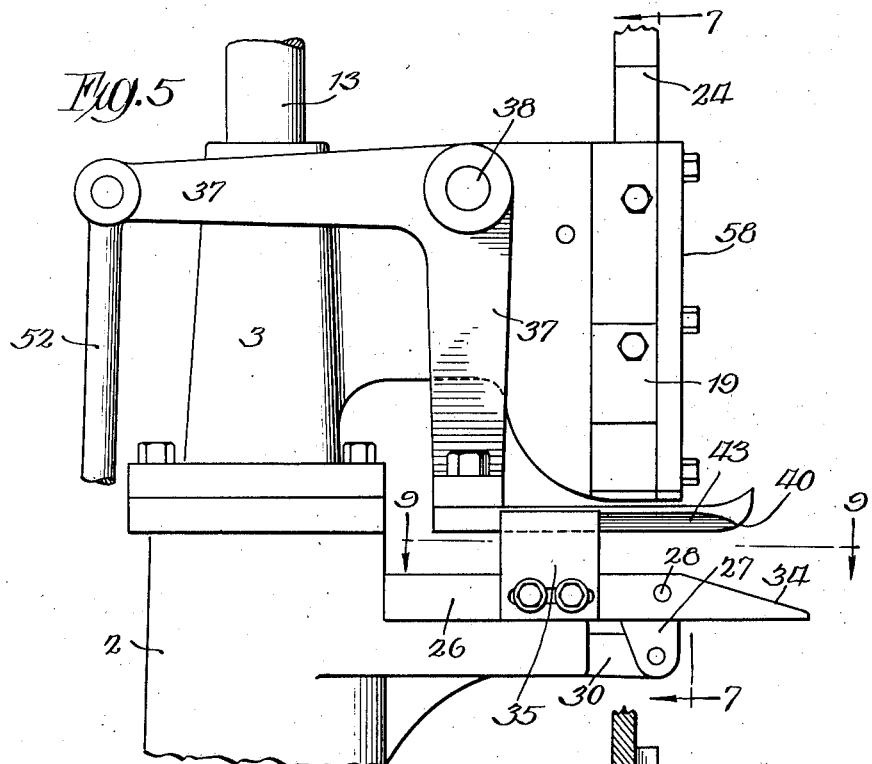
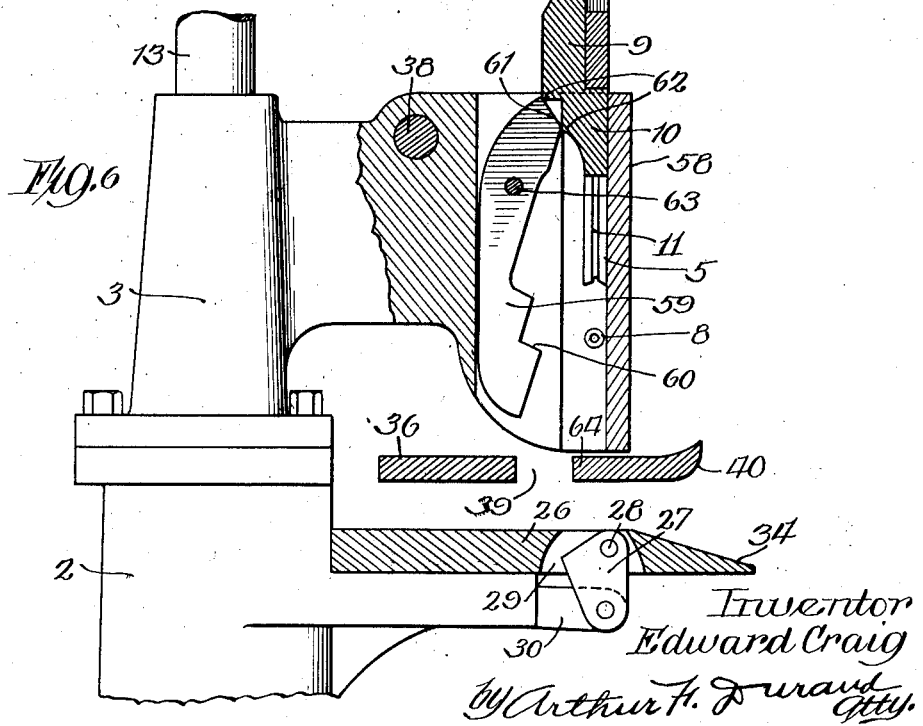
Inventor
Edward Craig
by Arthur H. Durand
Atty.

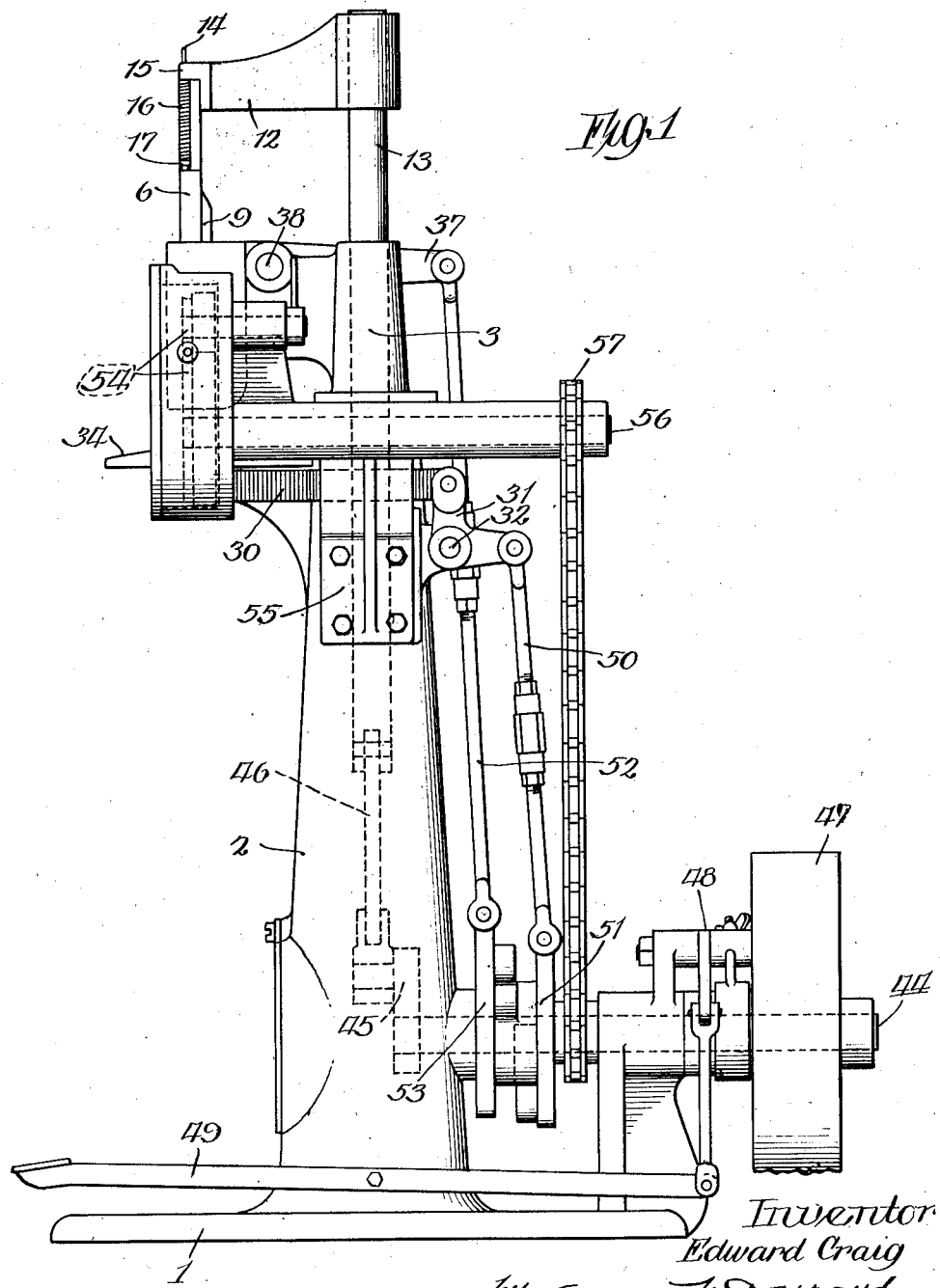

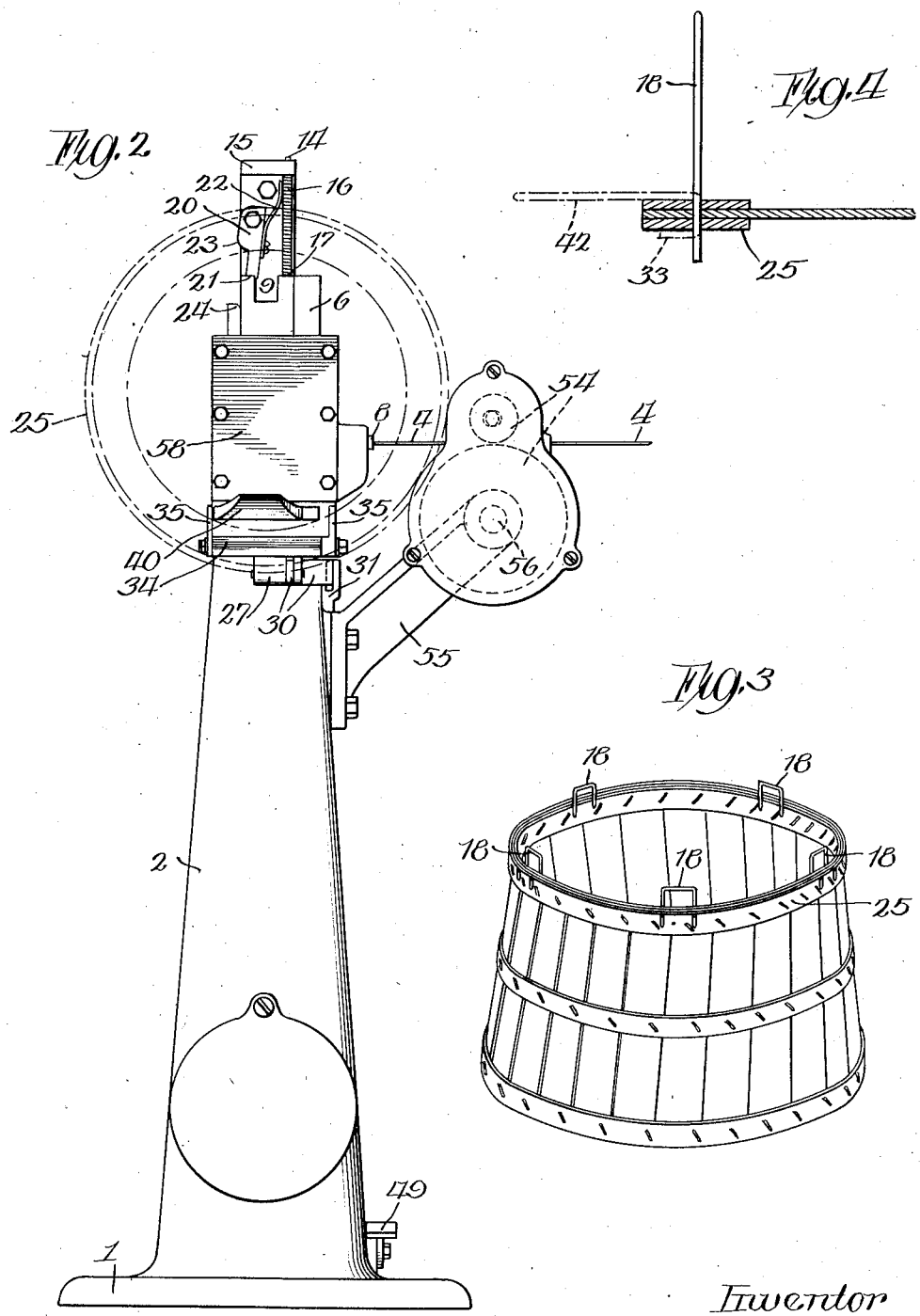

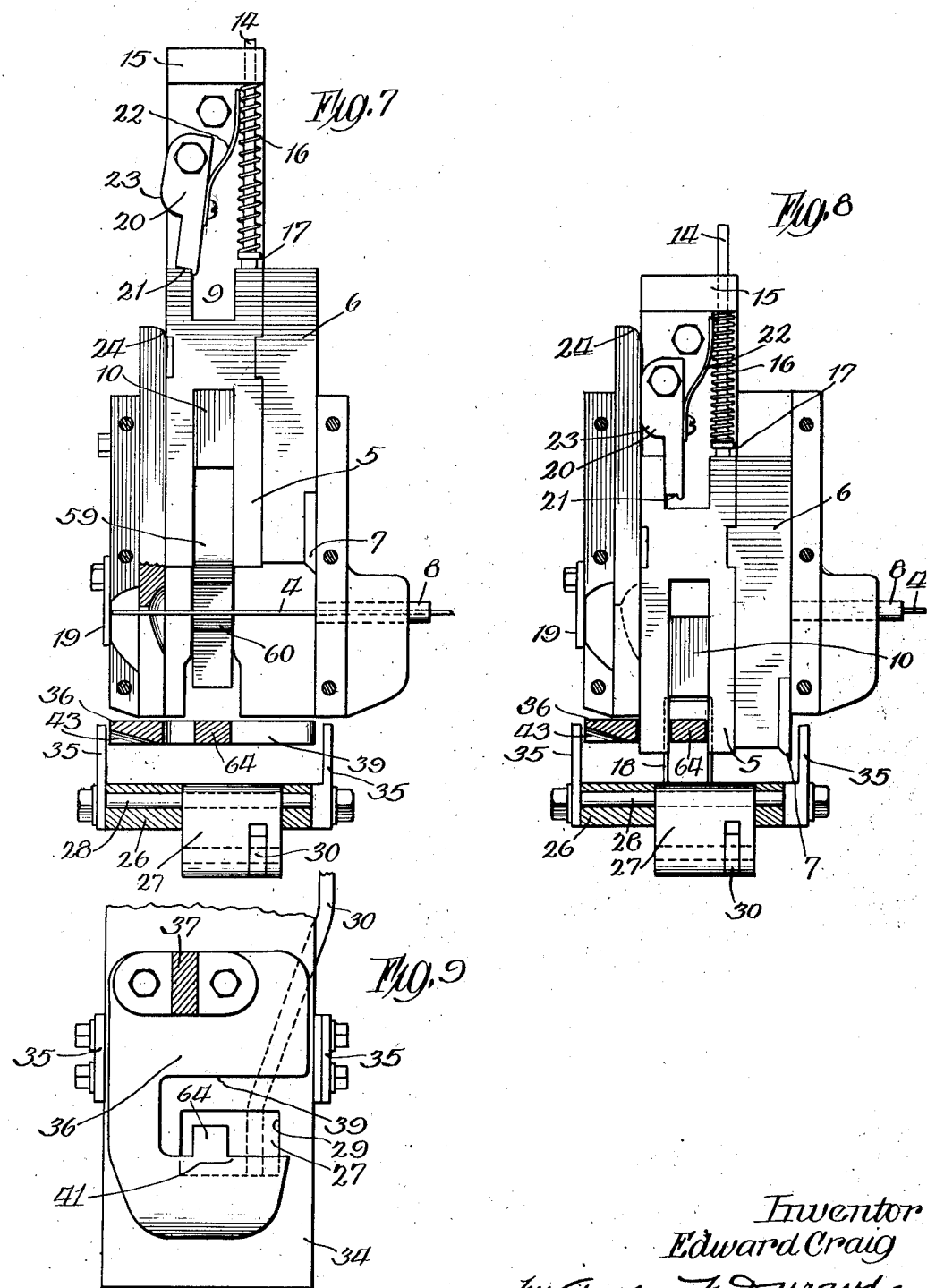

Patented Sept. 3, 1929.

1,726,528

UNITED STATES PATENT OFFICE.

EDWARD CRAIG, OF ST. JOSEPH, MICHIGAN, ASSIGNOR TO SARANAC AUTOMATIC MACHINE CORPORATION, OF BENTON HARBOR, MICHIGAN, A CORPORATION OF DELAWARE.

MACHINE FOR MAKING AND INSERTING WIRE DEVICES.

Application filed January 14, 1924. Serial No. 685,951.

This invention relates to machinery for attaching wire handles or handle like devices to baskets or other receptacles, and more particularly to machines for attaching wire handles or handle like devices to baskets which, when first made, and before being filled, are open at both ends thereof, such as certain bushel baskets of this kind, and contemplates, more specifically considered, the attachment of wire handles, or handle like devices, and the bending of these handles into such position that the basket may be filled, in a convenient manner, and in such a way that these handles or handle like devices may be then bent into position to hold the closure, such as the bottom of the basket, in place after the basket is filled.

Generally stated, therefore, the object of the invention is, to provide a novel and improved machine for making and driving a staple like or bail shaped device, in a basket or other receptacle, to serve as a handle, or as a handle like device, so that these devices may be used as handles, or as a means for securing a closure of the basket in place, in any suitable or desired manner, as will hereinafter more fully appear.

It is also an object to provide certain details and features of construction and combinations pending to increase the general efficiency and desirability of a machine for making and inserting bail shaped devices, for use as handles or fastening devices, or otherwise, of this particular form and character.

To this and other useful ends, the invention consists in matters hereinafter set forth and claimed and shown in the accompanying drawing in which:

Figure 1 is a side elevation of a machine for making and inserting bail shaped or staple like wire devices, in the form of handles or handle like devices, embodying the principles of the invention.

Figure 2 is a front elevation of said machine.

Figure 3 is a perspective of the product made by said machine, or of the basket having the bail shaped devices secured thereto.

Figure 4 is an enlarged detail sectional view showing the manner in which the bail shaped or handle like device is inserted through the rim or hoop portion of the basket, and is then bent over, into the position shown in dotted lines, so that these bail shaped wire devices assume the position shown in Figure 3 when the basket is removed from the machine.

Figure 5 is an enlarged side elevation of the upper portion of said machine.

Figure 6 is a view similar to Figure 5, but with certain portions thereof broken away, and with certain portions shown in vertical section, thereby to bring into view the forming and driving means, and the means for clinching the ends of the bail shaped or handle like wire device which is formed and driven by this machine.

Figure 7 is an enlarged front elevation of the upper portion of the machine, being in the nature of a vertical section on the line 7—7 in Figure 5.

Figure 8 is a view similar to Figure 7, but showing the forming and driving devices in a lower position, and showing the machine in the act of inserting the bail shaped or staple shaped device.

Figure 9 is a detail horizontal section on the line 9—9 in Figure 5.

As thus illustrated, the invention comprises a base 1 having an upright pedestal 2 thereon, upon the upper end of which is supported the stationary head 3 for the staple or bail forming and driving mechanism. This mechanism, as shown, is very similar to that employed for making and driving small staples, and is in fact, so far as the broad principle thereof is concerned, a staple forming and driving mechanism, inasmuch as this mechanism feeds the wire 4 into position and then cuts off a length of this wire and bends the severed portion of wire into a staple shaped or bail shaped device for insertion in the basket shown in Figure 3.

Said mechanism for cutting and driving the wire comprises, therefore, a vertically reciprocating staple former 5, which is rigid with the cutter bar 6 that carries the knife 7, this knife cooperating with the inner end of the feed tube 8 through which the wire is guided, thereby to cut off the length of wire as the staple former moves downward. This staple former is slidingly connected with the staple driver 9, which latter has a portion 10 that slides in the guide grooves 11 of the two prongs of the bifurcated staple former. The staple driver 9 is rigidly connected to the outer end of the arm 12, which latter is rigidly mounted upon the upper end of the rod 13 which is mounted to reciprocate vertically in the pedestal 2 and in the head 3 previously mentioned. The upper end of the staple former has a rod 14 which is adapted to slide up and down in the guide portion 15 on the arm 12, a compression spring 16 being interposed between the guide portion 15 and the shoulder 17 on said rod, whereby this spring is compressed when the lower end of the staple former engages the basket, and during the time that the staple driver is moving downward to insert the staple like or bail shaped wire device 18 shown in Figure 8 of the drawings. The wire 4 is fed into the path of the staple former and driver, until the end of the wire strikes the end of the stop 19, shown in Figures 7 and 8, this length of wire being necessary for the bail shaped or handle shaped device to be made. Normally, as shown, the staple former and driver are locked together by the latch 20 which is pivoted on the driver and which engages the upper end of the staple former at 21 while the former and driver are moving downward in unison to form the staple like or handle device. The spring 22 is adapted to yieldingly hold the latch 20 in operative position, but when the cam 23 on the latch strikes the stationary cam 24 on the casing of the mechanism, the latch is then disengaged from the staple former, and swings into the position shown in Figure 8, thereby allowing the downward movement to cease, and permitting the staple driver to proceed downward and insert the handle device through the hoop portion of the basket, as shown in full lines in Figure 4 of the drawings. In Figure 8, it is assumed that the lower end of the staple former 5 is resting on the basket, and that the staple shaped or handle shaped device 18 has been inserted. During this operation, the mechanism is within the smaller end of the basket shown in Figure 3, so that the outer surface of the hoop 25 is resting on the support 26 provided for this purpose, this support being rigid with the upper portion of the pedestal 2 previously mentioned. This support 26 has a pivoted clinch block or anvil 27 pivoted at 28 in a recess 29 formed therein, and a link 30 connects the lower end of this clinch block to the bell crank 31 which is pivoted at 32 on the stationary body portion of the machine. At the proper time, therefore, after the staple shaped or bail shaped or handle shaped wire device 18 has been inserted through the basket, the points of the staple like device are then clinched on the outer surface of the hoop 25 by the upward movement of the clinch block 27 at the proper time, so that the ends of the staple are bent over and toward the edge of the hoop 25, as indicated in dotted lines at 33 in Figure 4, and as shown in full lines in Figure 3 of the drawings. It will be seen that the support 26 is preferably beveled at 34 to facilitate the insertion of the edge of the basket, and a stop 35, which is adjustable, is secured to one side of the support 26 to limit the insertion of the basket below the stapling or handling or bail fastening mechanism.

After the staple shaped or bail shaped device is inserted, it is then necessary, or at least desirable, to bend the device over flatwise upon the inner surface of the basket, so that the several bail shaped devices when finally attached will appear as in Figure 3 of the drawings. For this purpose a plate 36 is rigidly secured to the lower end of the bell crank 37, which latter is pivoted at 38 upon the side of the head 3 previously mentioned. This plate 36 has an opening 39 through which the staple former and driver move downward to insert the staple, or staple like device, and the outer end of this plate 36 is rounded at 40 to bear and rub upon the inner surface of the basket when the plate 36 is moved backward to cause the edge 41 thereof to bend the staple like device 18 over and into the position indicated in dotted lines at 42 in Figure 4 of the drawings. Thus, in the embodiment of the invention herein shown and described, the points of the staple or bail shaped device are first clinched on the outer surface of the basket, and then the bail shaped head or outer end portion of the handle like device is bent over flatwise upon the inner surface of the basket or receptacle, so that when several of these devices are attached to the smaller end of the frustoconical basket shown in Figure 3, said devices will extend outward in the manner shown. The plate 36 is preferably beveled at 43 to provide clearance for the inner surface of the basket, inasmuch as this rim or hoop portion of the basket curves upwardly at each side of the stapling mechanism, during the operation of making and driving the bail shaped or staple shaped device. Two of the stops 35 may be employed, one at each side of the machine, as shown in Figures 7, 8 and 9, if such is desired.

The mechanism for operating the stapling mechanism, and for actuating the bell cranks 31 and 37, comprises a shaft 44 mounted in suitable bearings on the base of the machine, with the end of said shaft provided with a crank plate 45 connected by a rod 46 with the lower end of the rod 13 previously mentioned. A belt pulley 47 is mounted on said shaft, and a clutch mechanism 48, of any suitable character, is provided and controlled by foot lever 49, through the medium of any suitable connection. When the foot lever is pressed, the clutch is closed, and the belt driving the pulley 47 will then rotate the shaft 44, and thus actuate the stapling mechanism. The bell crank 31 is connected by a rod 50 to the cam device 51, of any suitable character, mounted on the shaft 44, whereby this rod 50 is reciprocated endwise in a manner to actuate the bell crank 31, thereby to actuate the link 30 of the clinch block 27 in the desired manner, as previously explained. A rod 52 connects the bell crank 37 with a similar cam device 53 on the shaft 44, whereby this rod 52 is reciprocated endwise to actuate the bell crank 37 in the desired manner, thereby to actuate the plate 36 at the moment when it is necessary to bend the bail shaped wire device outward in the manner previously explained. It will be understood that the devices 51 and 53 may be of any suitable or approved form, the only requirement being that they be capable of actuating the rods 50 and 52 up and down in properly timed relation to the other elements, thereby to perform the functions previously described.

Any suitable known or approved mechanism may be employed for feeding the wire 4 to the staple forming or handle forming or bail forming mechanism. As shown, feed rolls 54 as indicated in Figure 2, are suitably mounted at one side of the machine, on a bracket 55, the wire being fed between these rolls and when said roll being so relatively formed that the wire will be fed intermittently instead of continuously. At the same time, however, the lower feed roll is driven continuously on the shaft 56, mounted in a bearing on said bracket, and by the sprocket chain 57 which connects the shaft to a sprocket on the shaft 44 previously mentioned. Thus the lower feed roll is rotated continuously, but by reason of the cooperation of this roll, relatively to the upper roll, in a common and well known manner, the wire is fed intermittently, and is only caused to move forward after the forming and driving mechanism has moved upward to the position shown in Figure 7, for then the wire is free to feed forward without hindrance until it strikes the stop 19 previously mentioned. But the wire feeding mechanism forms no part of the invention, and may be of any suitable or desired character.

A face plate 58 is preferably applied to the casing of the staple forming and driving mechanism, and when this plate is removed, the mechanism is brought into view, as shown in Figures 7 and 8, and may be removed if such is desirable or necessary. Thus the staple former 5 cuts off a length of wire which is much longer than the width of the staple former, but clearance is provided to permit the end portions of this length of wire to be bent downward, and for this bending operation an anvil 59 is necessary, or at least desirable, the wire being fed immediately above the shoulder 60 on said anvil, and the latter having a cam portion 61 which is engaged by the shoulder 62 on the staple former to swing the lower end of the anvil out of the way after the staple is formed, so that the portion 10 may then move downward and insert the staple, the latter sliding at such time in the grooves 11 with which the inner edges of the prongs or side portions of the staple former are provided. The anvil 59 is pivoted at 63, it will be seen, so that its lower end swings into and out of the path of the staple driver 10, and between the prongs of the staple former, in a manner which will be readily understood. However, as previously explained, and for some of the broader purposes of the invention, the staple forming and driving mechanism may be of any suitable or approved form, and while that shown and described, including the said anvil 59, is calculated to do the work in a satisfactory manner, taking into account the very heavy wire which must be employed for this purpose, it will be understood that the plate 36, which latter is desirable for the particular work to be performed, can be arranged to cooperate with staple forming and driving mechanism of any suitable or well known or desired form.

The basket shown in Figure 3 is of a well known form, being open at both the smaller and larger ends thereof, so that the basket may have a cover secured on the larger end and may then be filled through the smaller end thereof. After the basket is filled, a cover in the nature of a bottom for the basket can then be placed into position, on the smaller end, this smaller end being disposed uppermost when the basket is filled. Then the devices 18 which have been inserted can be bent over flatwise upon the bottom closure, thereby to hold this bottom in place. For this reason, therefore, and for this particular purpose, the wire employed is preferably of a large caliber, is preferably quite strong and stiff, so that when bent over in this way, the bottom closure will be securely held in position. Then when the basket is to be opened and unpacked, it is placed with its smaller end downward, on the floor or on a table, and the cover for the upper or larger end of the basket is then removed.

Obviously, however, the machine shown and described may be employed for inserting staple shaped or bail shaped or handle shaped devices of this kind for any suitable or desired purpose. Devices of this kind may be inserted to serve as fastening devices, as shown and described, or they may be inserted to serve as handles, either before or after the product is finished, in a basket or other receptacle, for any suitable or desired purpose. In other words, the machine is adapted to make and drive a staple shaped or bail shaped or handle shaped wire device, and this device may, of course, be used for any suitable or desired purpose after being formed and driven or inserted, in a basket or other structure. It will be seen, however, that the machine shown and described does not fully insert the staple shaped wire device, as is usually the case with stapling machinery, but to the contrary, only partially inserts the staple shaped or bail shaped devices, leaving the bail shaped head or end thereof upstanding in position to be used for any suitable or desired purpose. The sharp ends of the staple shaped or handle shaped device are clinched, upon the outer surface of the basket, but the device is not inserted until the transverse portion or head thereof lies flatwise upon the inner surface of the basket, for the staple shaped device is only inserted just far enough to bring the sharp ends thereof through the hoop portion or rim portion of the basket, and far enough to permit these sharp ends to project a distance, permitting them to be clinched or bent over in the manner described. In other words, the staple shaped device is partially inserted, and is thereafter bent over at each end thereof, upon the opposite sides of the thickness of material through which the staple shaped or bail shaped device is partially inserted.

As a matter of further and special improvement, it will be seen that the plate 36 is preferably provided with a projection 64, on its edge 41, which projection is just wide enough to extend between the legs of the staple or bail shaped wire device, whereby the legs of the wire device will be supported and caused to move downward in the desired manner without buckling or bending, when the device is driven into the basket or other commodity. Of course, this projection 64 is short enough or of such size that the head of the staple will not be prevented from being bent or wiped over by the edge 41 of the plate, when the latter is actuated to bend over the uninserted or head portion of the staple, in the manner previously explained.

What I claim as my invention is:

1. In a machine for making and inserting a bail shaped wire device, the combination of mechanism for first forming the bail shaped wire device, and for inserting both legs of said device in any desired material, while the side portions or two legs of the bail shaped device are still straight and parallel, automatic instrumentalities for thereafter bending the head of said bail shaped device over toward the material in which the device is inserted, causing the parallel inserted end portions of the two legs to assume an angle to the uninserted parallel portions thereof, and means to cause the successive operation of said mechanism and instrumentalities.

2. A structure as specified in claim 1, said mechanism being adapted to insert said bail shaped device in a manner to cause the points thereof to protrude at the outer side of said material, in combination with anvil means to clinch the points of the bail shaped device by bending them laterally against the surface of the material, whereby the protruding points of the staple shaped device and the head portion thereof are substantially parallel when the operation of the machine is completed.

3. A structure as specified in claim 1, in combination with means to clinch the points of the bail shaped device.

4. A structure as specified in claim 1, in combination with means to feed a length of wire from which to make said bail shaped device, and said mechanism comprising a bale former having a cutting device for cutting off the desired length of wire, the width of said former being less than the length of the severed portion of the wire, and said mechanism comprising an anvil cooperating with said bail former to bend the severed length of wire into bail form, and a driver for engaging the head of the bail shaped device thus formed to insert the points thereof in the desired material.

5. A structure as specified in claim 1, said instrumentalities comprising a member for engaging the bail shaped device at one side thereof, and means for actuating this member to bend the wire device over upon the surface of the material.

6. A structure as specified in claim 1, said instrumentalities comprising a member for engaging the side of said wire device, to bend the device a bell crank to which said member is rigidly secured, and means for actuating said bell crank.

7. A structure as specified in claim 1, in combination with a pivoted anvil for engaging the points of the bail shaped wire device, and means for actuating said pivoted anvil, thereby to bend both points in the same direction.

8. In a machine of the class described, the combination of mechanism for forming and inserting both legs of a wire device having parallel straight legs, with the straight transverse head portion of said wire device some distance from one side of the material in which the device is inserted, and with the ends of said straight parallel legs projecting at the other side, and means for thereafter bending the points of said legs flatwise against the other side of the material.

9. In a machine of the class described, the combination of means for supporting a basket in position to have a wire device inserted outwardly from inside the basket through the rim portion thereof, mechanism for forming said wire device within the basket, means to cause the insertion of the device outwardly as stated, to fix the device in one side only of the rim, and instrumentalities to cause the operation of said mechanism and means.

10. A structure as specified in claim 9, in combination with means for clinching the sharp points of said wire device upon the outer surface of said rim portion of the basket.

11. A structure as specified in claim 9, in combination with instrumentalities for bending the head portion of said wire device outward toward the edge of the rim, against the inner side of the rim, so that the head of said wire device will project a distance beyond said edge of the rim.

12. A structure as specified in claim 9, in combination with instrumentalities for bending the uninserted portion of said wire device against the inner surface of the rim portion of the basket.

13. A structure as specified in claim 9, said mechanism comprising a wire device former having means rigid therewith to cut off a length of wire, the width of said wire device former being less than the length of the severed portion of the wire, a stop for the end of the wire, whereby the opposite ends of the severed portion of the wire project beyond the opposite sides of the wire device former, an anvil cooperating with said wire device former to bend the severed portion of wire into wire device form, and a driver for engaging the head of the wire device to insert the points thereof in the material of the basket.

14. A structure as specified in claim 9, in combination with a movable member disposed between said mechanism and the inner surface of the basket, and means for actuating said member to cause the edge thereof to bear against the side of the wire device, thereby to bend the head portion of the wire device over toward the rim of the basket, so that the head of said wire device will extend beyond said edge of the rim.

15. The improved wire forming and driving mechanism, having means to automatically form the wire, drive it into the work, and thereafter bend it over at the head thereof, means for supporting the work in operative relation thereto, and power operated instrumentalities to cause the said operation of said mechanism, to cause the wire to become a bail shaped attached element with the two legs thereof anchored in the work, with the transverse portion of the element spaced a distance from the work.

16. A structure as specified in claim 8, said bending means comprising a plate having a projection to extend between the legs of the device, to support the same in position for partial insertion.

17. A structure as specified in claim 1, said instrumentalities having means forming a guide for the legs of the bail shaped wire device, thereby to insure proper insertion of both legs in said material.

18. In a machine for making and inserting a bail shaped wire device, the combination of means for partially inserting said device into any desired material, means forming a guide to engage the inner side of the bail shaped device to insure insertion in the proper manner, and means for bending over the head portion of said wire device.

19. In a machine for making and inserting a bail shaped wire device, through the rim portion of a basket, the combination of instrumentalities for cutting off a length of wire and bending it into bail shape, means for supporting the basket with the inner side of the rim thereof facing the ends of the two legs of the bail shaped device, means for relatively moving said device and basket to cause the two legs to be inserted outwardly through the rim portion of the basket, and means for causing the outer end portions of said legs to be bent back upon the outer surface of the rim portion of the basket.

20. A structure as specified in claim 19, comprising means for bending the legs against the inner surface of the rim portion of the basket, whereby the bail shaped head portion of the device extends a distance beyond the edge of the basket in a plane substantially at right angles to the plane of the two leg portions that extend through the rim portion of the basket.

21. A structure as specified in claim 19, comprising means whereby the bail shaped head portion of the device is bent against the inner surface of the rim of the basket after the insertion of the legs through the rim portion of the basket.

22. In a machine of the class described, the combination of mechanism for partially inserting a bail-shaped or staple-shaped wire device having a transverse head and straight legs, in the desired material, and devices operative to thereafter bend over the head portion of said device, causing the uninserted leg portions of said device to assume an angle to the inserted leg portions.

23. A structure as specified in claim 22, including means for clinching the points of the legs in said material.

24. A structure as specified in claim 22, including instrumentalities for feeding the wire, cutting off the length thereof, and forming the severed length into said device, preliminary to said insertion thereof.

EDWARD CRAIG.